US009269110B2

(12) United States Patent
Blake et al.

(10) Patent No.: US 9,269,110 B2
(45) Date of Patent: Feb. 23, 2016

(54) SYSTEM AND METHOD FOR INTERFACE AND INTERACTION WITH INTERNET APPLICATIONS

(76) Inventors: Jonathan Blake, Vancouver (CA); Clayton Gunars Strauts, Vancouver (CA)

( * ) Notice: Subject to any disclaimer, the term of this patent is extended or adjusted under 35 U.S.C. 154(b) by 1127 days.

(21) Appl. No.: 13/280,222

(22) Filed: Oct. 24, 2011

(65) Prior Publication Data

US 2013/0104070 A1 Apr. 25, 2013

(51) Int. Cl.
*G06F 3/048* (2013.01)
*G06Q 50/00* (2012.01)

(52) U.S. Cl.
CPC ...................................... *G06Q 50/01* (2013.01)

(58) Field of Classification Search
CPC ....... G06Q 50/00; G06F 3/0482; G06F 3/048; H04L 51/32; H04L 67/306; H04L 12/588
See application file for complete search history.

(56) References Cited

U.S. PATENT DOCUMENTS

| | | | | |
|---|---|---|---|---|
| 7,599,983 | B2 | 10/2009 | Harper et al. | |
| 7,669,123 | B2 | 2/2010 | Zuckerberg et al. | |
| 7,797,256 | B2 | 9/2010 | Zuckerberg et al. | |
| 7,827,208 | B2 | 11/2010 | Bosworth et al. | |
| 7,890,501 | B2 | 2/2011 | Lunt et al. | |
| 7,908,342 | B2 | 3/2011 | Harper et al. | |
| 7,970,657 | B2 | 6/2011 | Morgenstern | |
| 8,135,801 | B2 | 3/2012 | Harper et al. | |
| 8,171,128 | B2 | 5/2012 | Zuckerberg et al. | |
| 8,225,376 | B2 | 7/2012 | Zuckerberg et al. | |
| 8,271,894 | B1 | 9/2012 | Mayers | |
| 8,375,331 | B1 | 2/2013 | Mayers | |
| 8,549,651 | B2 | 10/2013 | Callahan et al. | |
| 8,977,611 | B2 * | 3/2015 | Tseng | 707/728 |
| 2007/0250496 | A1 * | 10/2007 | Halliday et al. | 707/5 |
| 2008/0040673 | A1 * | 2/2008 | Zuckerberg et al. | 715/745 |
| 2009/0031301 | A1 | 1/2009 | D'Angelo et al. | |
| 2009/0048922 | A1 | 2/2009 | Morgenstern et al. | |
| 2009/0049070 | A1 | 2/2009 | Steinberg | |
| 2009/0109959 | A1 | 4/2009 | Elliot et al. | |
| 2012/0069131 | A1 | 3/2012 | Abelow | |
| 2012/0131610 | A1 | 5/2012 | Gutierrez et al. | |

(Continued)

OTHER PUBLICATIONS www.engadget.com/photos/google-webapp-hands-on/#4259114. Publication: Jun. 28, 2011 Author: Brian Heater.

(Continued)

*Primary Examiner* — Boris Pesin
*Assistant Examiner* — Ayesha Huertas Torres
(74) *Attorney, Agent, or Firm* — Palmer IP

(57) ABSTRACT

A graphical user interface system for displaying content on a user interface and for integrating and manipulating social network content includes a display window for displaying and manipulating content from at least one social network; a horizontal panel for manipulating content from at least one social network; and tabs on the horizontal panel and user-selectable for manipulating the content. The tabs disposed on the horizontal panel may include a post tab for selecting a type of content to be manipulated; a media tab for manipulating audio/visual media content; a social tab for manipulating one or more social media or communication content in the social network; a persona tab for configuring at least one user-persona associated with the content to be manipulated; and an account tab for managing at least one external user account or profile when interacting with the content.

22 Claims, 7 Drawing Sheets

(56) References Cited

U.S. PATENT DOCUMENTS

2012/0289217 A1 11/2012 Riemer et al.
2013/0073473 A1 3/2013 Heath

OTHER PUBLICATIONS techcrunch.com/2011/06/29/google-plus-is-actually-pretty-good/ Publication: Jun. 29, 2011 Author: MG Siegler.
www.readwriteweb.com/archives/first_night_with_google_plus_this_is_very_cool.php#more Publication: Jun. 28, 2011 Author: Marshall Kirkpatrick.
www.readwriteweb.com/archives/3_steps_google_must_take_to_win_against_facebook.php Publication: Jun. 29, 2011 Author: Zubin Wadia.
techcrunch.com/2011/06/29/does-the-google-interface-remind-you-of-facebook-youre-not-the-only-one/ Publication: Jun. 29, 2011 Author: Robin Wauters.
twitpic.com/5iiwos/full Publication: Jun. 29, 2011 Author: @uxboy.
Google Gmail conversations—"Dream" (redacted)—Jun. 3, 2011 Publication Date: Dec. 13, 2011 Source URL: picostormlabs.tumblr.com/post/14159402994/it-has-come-to-our-attention Author: Jonathan Blake, Clayton Strauts.
Google Gmail conversations—"Flozaic Launcher" (redacted)—May 26-27, 2011 Publication Date: Dec. 13, 2011 Source URL: picostormlabs.tumblr.com/post/14159402994/it-has-come-to-our-attention Author: Jonathan Blake, Clayton Strauts.
Google Gmail conversations—"Flozaic, the Social Mosaic" (redacted)—Apr. 27, 2011 Publication Date: Dec. 13, 2011 Source URL: picostormlabs.tumblr.com/post/14159402994/it-has-come-to-our-attention Author: Jonathan Blake, Clayton Strauts.
www.techvibes.com/blog/vancouvers-picostorm-code-labs-unveils-flozaic-a-social-mosaic-2011-10-28 Publication: Oct. 28, 2011 Author: Techvibes.
picostormlabs.tumblr.com/post/14159402994/it-has-come-to-our-attention Publication: Dec. 13, 2011 Author: Jonathan Blake, Clayton Strauts.
picostormlabs.tumblr.com Publication: Apr. 27, 2011 Author: Jonathan Blake, Clayton Strauts.
www.irreality.net/microcosm/datastream.
liveweb.waybackmachine.org/http://www.livejournal.com/poll/?id=798833.
irreality.Ichost.co.uk/hive/wallist.php Publication: Dec. 21, 2002 Author: Jonathan Blake.
irreality.Ichost.co.uk/realitycheck/index2.php Publication: May 17, 2001 Author: Jonathan Blake.
replay.waybackmachine.org/20040925044917/http://www.irreality.org.uk/ Publication: Sep. 25, 2004 Author: Jonathan Blake.
replay.waybackmachine.org/20041127171612/http://www.irreality.org.uk/biolog/squink&skip=10 Publication: Oct. 26, 2004 Author: Jonathan Blake.
community.livejournal.com/irreality/2003/02/08/ Publication: Feb. 8, 2003 Author: Jonathan Blake.
community.livejournal.com/irreality/2003/03/05/ Publication: Mar. 5, 2003 Author: Angela (Angelina) Fabbro.
replay.waybackmachine.org/20030204180607/http://www.livejournal.com/~sQuink/?skip=40 Publication: Jan. 4, 2003 Author: Jonathan Blake.
community.livejoumal.com/irreality/36416.html#cutid 1 Publication: Dec. 20, 2006 Author: @chaoflux23, Angela Fabbro, Jonathan Blake.
replay.waybackmachine.org/20040926112559/http://www.irrealityhelix.org.uk/attractor/ Publication: Jun. 5, 2004 Author: Jonathan Blake.
replay.waybackmachine.org/20030518044921/http://www.irreality.org.uk/index.php?page=graffiti-wall Publication: May 17, 2003 Author: Jonathan Blake.
replay.waybackmachine.org/20030517000555/http://www.irreality.org.uk/index.php?page=columns Publication: May 16, 2003 Author: Jonathan Blake.
Internet publication, "A history of innovation", published Dec. 14, 2011 Publication: Dec. 13, 2011 Author: Jonathan Blake, Clayton Strauts.
replay.waybackmachine.org/20041011084850/http://www.irreality.org.uk//index.php?element=7&fractal=12&userID=Gn0s1s Publication: Oct. 2, 2004 Author: Jonathan Blake, Clayton Strauts.
community.livejournal.com/irreality/35492.html Publication: Aug. 8, 2006 Author: Jonathan Blake.
community.livejournal.com/irreality/33462.html Publication: Jun. 6, 2006 Author: Jonathan Blake.
replay.waybackmachine.org/20060603004603/http://irreality.net Publication: Jun. 2, 2006 Author: Jonathan Blake, multiple internet users.
replay.waybackmachine.org/20060820164140/http://irreality.net Publication: Aug. 18, 2006 Author: Jonathan Blake, multiple internet users.
irreality.net/microcosm/cortex Publication: Dec. 25, 2006 Author: Jonathan Blake.
www.allfacebook.com/facebook-feed-patent-2010-02 Publication: Feb. 25, 2010 Author: Nick O'Neill, AllFacebook.com.
Dec. 20, 2006 interview News Article http://technoccult.net/archives/2006/12/20/interview-with-irrealitys-triskele-and-squink/ Publication: Dec. 20, 2006 Author: Klint Finley.
web.archive.org/web/20030820221018/http://www.irreality.org.uk/index.php?page=news Publication: Aug. 20, 2003 Author: Jonathan Blake.
web.archive.org/web/20030820212123/http://www.irreality.org.uk/index.php?page=news/articles Publication: Aug. 20, 2003 Author: Jonathan Blake.
web.archive.org/web/20030815192851/http://www.irreality.org.uk/index.php?page=events Publication: Aug. 15, 2003 Author: Jonathan Blake.
web.archive.org/web/20030518045700/http://www.irreality.org.uk/index.php?page=events&eid=1031580516 Publication: May 18, 2003 Author: Jonathan Blake.
web.archive.org/web/20030710090221/http://www.irreality.org.uk/i4store/agora.cgi Publication: Jul. 10, 2003 Author: Jonathan Blake.
web.archive.org/web/20030520035421/http://www.irreality.org.uk/index.php?page=polls Publication: May 20, 2003 Author: Jonathan Blake.
web.archive.org/web/20030614170239/http://irreality.org.uk/index.php?page=polls&disp=spec&pollid=1837752669 Publication: May 14, 2003 Author: Jonathan Blake.
web.archive.org/web/20021230151355/http://irreality.Ichost.co.uk/hive/create.php Publication: Dec. 30, 2002 Author: Jonathan Blake.
http://web.archive.org/web/20030820220126/http://www.irreality.org.uk/index.php?page=users Publication: Aug. 20, 2003 Author: Jonathan Blake.
http://web.archive.org/web/20030825020139/http://irreality.org.uk/index.php?page=news/articles&nid=1558959899 Publication: Aug. 25, 2003 Author: Jonathan Blake, "Pita".
web.archive.org/web/20030731113440/http://ww.irreality.org.uk/index.php?page=news/articles&nid=800187378 Publication: Jul. 31, 2003 Author: Jonathan Blake, "braille_teeth".
web.archive.org/web/20050324004957/http://irreality.org.uk/ Publication: Mar. 24, 2005 Author: Jonathan Blake.
web.archive.org/web/20050211081708/http://irreality.org.uk/ Publication: Feb. 11, 2005 Author: Jonathan Blake.
web.archive.org/web/20041011080027/http://www.irreality.org.uk/index.php?element=4&fractal=5 Publication: Oct. 11, 2004 Author: Jonathan Blake.
web.archive.org/web/2004101100045/http://www.irreality.org.uk/index.php?element=4&fractal=4 Publication: Oct. 11, 2004 Author: Jonathan Blake.
web.archive.org/web/20050112212505/http://irreality.org.uk/index.php?element=4&fractal=3 Publication: Jan. 12, 2005 Author: Jonathan Blake.
http://web.archive.org/web/20040402110348/http://irreality.org.uk/index.php?complex=complexA&floor=5&room=0 Publication: Apr. 2, 2004 Author: Jonathan Blake.

(56) References Cited

OTHER PUBLICATIONS web.archive.org/web/20050226235727/http://irreality.org.uk/index.php?spiral=8&s=15 Publication: Feb. 26, 2005 Author: Jonathan Blake.
livejournal.com Publication: Apr. 15, 2005 Author: Brad Fitzpatrick.
irreality.Ichost.co.uk/ Publication: Oct. 8, 2002 Author: Jonathan Blake.
mashable.com/2011/12/08/google-schemer/ Publication: Dec. 8, 2011 Author: Lauren Indvik.
www.schemer.com/about?lo=1 Publication: Dec. 12, 2011 Author: Google.
plus.google.com/u/0/102146313345435500422/posts/DzRcMpKiUzA No Longer Available.
techcrunch.com/2011/12/08/google-launches-schemer-an-activity-recommendation-engine-to-discover-new-things-to-do/ Publication: Dec. 8, 2011 Author: Leena Rao.
picostormlabs.tumblr.com/post/11977896983/for-the-last-12-months-picostorm-code-labs-has Publication: Oct. 26, 2011 Author: Jonathan Blake, Clayton Strauts.
Google Gmail conversations—"A Name" (redacted)—Aug. 26-27, 2010 Publication Date: Dec. 13, 2011 Source URL: picostormlabs.tumblr.com/post/14159402994/it-has-come-to-our-attention Author: Jonathan Blake, Clayton Strauts.
Google Gmail conversations—"Google plus one" (redacted)—Jun. 28-29, 2011 Publication Date: Dec. 13, 2011 Source URL: picostormlabs.tumblr.com/post/14159402994/it-has-come-to-our-attention Author: Jonathan Blake, Clayton Strauts.
www.engadget.com/2011/06/28/google-invite-received-we-go-hands-on/ Publication: Jun. 28, 2011 Author: Brian Heater.
services.google.com/fb/forms/googleplus/ >> https://www.google.com/+ Publication: Jun. 28, 2011 Author: Google.
www.google.com/+/learnmore/ Publication: Jun. 28, 2011 Author: Google.

* cited by examiner

SYSTEM AND METHOD FOR INTERFACE AND INTERACTION WITH INTERNET APPLICATIONS

1. TECHNICAL FIELD

The present invention relates generally to systems and methods for graphical user interfaces for computer systems, and more particularly to systems and methods for providing a graphical user interface for user interface and interaction with internet communication and social network content.

2. BACKGROUND OF THE INVENTION

More and more people are increasingly using virtual products and services on their personal computing devices, such as using electronic mail (i.e. e-mail) and instant messaging, to communicate with one another. Many people are also using Internet based social networking, content sharing and dating tools to network and interact with others. People are also increasingly using online banking tools to manage their personal finances without having to visit a physical bank branch. More and more people are also using virtual tools for entertainment and leisure activities, such as Internet based games, online movies, Internet music, virtual books and magazines, and news and sports score feeds. Moreover, people are increasingly using mobile computing devices, such as mobile phones, laptop computers, and tablets, to access and for use with these virtual products and services.

With the increasing popularity of using virtual products and services available on personal computing devices and desire to maintain one's privacy, anonymity, or to separate interaction with multiple different groups of people or spheres of interest, many people have developed multiple virtual personas for themselves, such as professional and personal personas. For example, many people use different email addresses to separate their professional and personal communication. Many people also create separate professional and personal profiles on social networks to maintain privacy between their professional and personal lives. Some people even maintain multiple professional or multiple personal personas. Managing these multiple personas in order to preserve personal privacy can be time consuming, inefficient, and frustrating. The present invention facilitates the ability to do these things quickly, efficiently, and simultaneously by eliminating the need to interact with multiple accounts, profiles or data sources and destinations separately.

For the purposes of the present application, a graphical user interface (GUI) refers to one or more of the interface components typically displayed on a display of a computing device that allow for interaction and manipulation by the a user and the data with which the user interacts. GUI interfaces may emulate a virtual desktop environment, display graphics, and allow interaction between a user and virtual profiles or accounts through, for example, a screen, a touchscreen, or an input device on a personal computing device.

For the purposes of the present application, an "icon" is a graphic image which may be displayed on a computer screen or other computing display device and usually corresponds in appearance to the type of information, system resource, or application which it provides access to when it is visible. It is a graphical object which represents and serves to identify information, system resources, applications, and the like, and may exist inside any particular window, including the virtual desktop itself. An icon may be associated with a particular collection of computer information, typically representing a "file" which may be a collection of data, a particular device or device handle, an application, program, and the like. An icon also may represent a window corresponding to, for example, an application in an active but "minimized" state.

A "file" generally refers to a collection of information or data which the user wishes to use, create or modify; each particular file has an associated unique name for identification by both the system and the user. Any given file may typically be located within the information management system by knowing a file name, an iconographic representation associated with the name, or a window name associated, for example, with a group of files which are stored together. All information (files) grouped within a particular window may be identified with that particular window's own identification location within the computer information management system. Accordingly, a user interface screen display, for example, may be broken down into multiple windows and graphic icons.

Another important element of some conventional user interfaces is a screen cursor. The cursor allows direct user control over the user interface and generally represents the point on the desktop which is presently "active", e.g. where input may be received, or output may be seen or taken. A user interface may be complemented with a "mouse" or other suitable pointing device and a corresponding "pointer" which makes up the cursor control device and provides the "point-and-click" user interface. The pointer may be used to change where on the desktop the active cursor is at a given time. A mouse may typically be an electromechanical device that translates two-dimensional mouse movement controlled by a user into a two-dimensional screen position movement represented by, for example, a pointer or arrowhead. The user may contact and direct the mouse while observing the position of the pointer on the screen thus bringing the user and the computer closer together via the interaction between the user, the mouse, the pointer and the display. When the mouse is moved signals are generated and input to the computer on an input port and the pointer moves correspondingly to a point on the display. Visual feedback may be used to control the exact location of the pointer by movement of the mouse. In addition, the computer may store the location of the pointer which corresponds to an exact location on the display. It should be noted that the computer may also store the location of each icon or other interactive object such that when the pointer and an icon location coincide, specific actions may be taken by the user to "activate" the icon as described in greater detail herein below. In other systems, such as those utilizing a touchscreen display device, pointing functionality may be substituted by the user touching the screen in a desired location with their finger, or other suitable stylus or pointing device, for example.

In systems using a mouse, the mouse may also be provided with one or more push buttons which may be used to effectuate control over the pointer by selecting or deselecting specific icons or other interactive tools. The mouse may be considered to be "activated" when the mouse button is depressed and the pointer remains active until the button is released. Pointer activation may also be initiated by sequences of mouse button presses, such as a "double click" interaction which involves rapidly pressing the mouse button press twice in sequence. By placing the pointer in a new location on the desktop and "clicking" or "double clicking", the location of the active cursor, for example, may be changed to a new window, or, for example, an application may be launched by "double clicking" on the application's icon. However, as the desktop-becomes increasingly crowded with icons, open windows and other selection options problems may arise. Analogously, in touchscreen systems, single or double touches of the screen may be used to activate user interface features, for example.

Toolbars offer easier and more direct access to key commands of an application by presenting these commands as buttons either as part of the application's primary task window or in a floating window. Toolbars are typically programmed by an application developer as part of an application program since the function associated with the toolbar selection is often closely tied to one or more functions performed by the application. Problems arise, however, in that if a configuration change is needed in the application requiring, for example, that new functions must be added to the application toolbar, a separate and complex human interface dedicated to the task of adding the new function is required. Often times, rebuilding of the application (e.g. compiling, linking, and the like) is needed to change the configuration of the toolbar. Moreover, as other, similar applications are used, a separate toolbar must be configured for each application and deliberately saved to preserve the new toolbar settings for the particular application.

3. SUMMARY OF THE INVENTION

In one embodiment according to the present invention, a system and method may be provided for a user to interface and interact with internet applications, such as communications and social network applications and associated content, for example. In a further embodiment, menu tools may be provided for interaction by a user with one or more sources of content, such as social media or communication content, in a user interface for use within an operating system.

In another embodiment according to the present invention, a graphical user interface system may be provided for displaying content on a user interface and for integrating and manipulating social network content. In such an embodiment, the graphical user interface system may comprise: a display window disposed within the user interface for displaying and manipulating content from at least one social network; a horizontal panel for manipulating content from at least one social network; and a plurality of tabs disposed on the horizontal panel and selectable by a user for manipulating the content from the at least one social network and the display window. In such an embodiment, the plurality of tabs disposed on the horizontal panel and selectable by a user for manipulating such content may comprise: a post tab for selecting a type of content to be manipulated; a media tab for manipulating audio/visual media content; a social tab for manipulating one or more social media or communication content in the social network; a persona tab for configuring at least one user-persona associated with the content to be manipulated; and an account tab for managing at least one external user account or profile when interacting with the content.

In yet another embodiment according to the present invention, the horizontal panel for manipulating content from at least one social network of the graphical user interface system may also be movable within the graphical user interface independently of the display window for displaying and manipulating content.

In a further embodiment according to the present invention, the graphical user interface system may also comprise a vertical panel for displaying chronologically updated content from at least one social network feed. In such an embodiment, the vertical panel may comprise: a content category selection tab for selecting a type of content to be displayed in the vertical panel, and windows for displaying an image from at least one user-persona or feed, each of the windows comprising a drop down box comprising information about the image from at least one user-persona or feed. In such an embodiment, the information and content from the at least one social network feed may also comprise at least one of: an email account; an online banking account; a news feed; a chat forum; an instant message system; a music account; an audio/visual media account; a social network account; or an Internet-based search engine.

In yet a further embodiment according to the present invention, a method of integrating and manipulating social network content on a graphical user interface system may be provided. In such an embodiment, the method may comprise: providing a graphical user interface system where the system comprises: a display window disposed within the user interface displaying and content from at least one social network; a horizontal panel for manipulating content from at least one social network; and a plurality of tabs disposed on the horizontal panel and selectable by a user for manipulating the content from the at least one social network and the display window. In such an embodiment, the plurality of tabs disposed on the horizontal panel may comprise: a post tab for selecting a type of content to be manipulated; a media tab for manipulating audio/visual media content; a social tab for manipulating one or more social media or communication content in the social network; a persona tab for configuring at least one user-persona associated with the content to be manipulated; and an account tab for managing at least one external user account or profile when interacting with the content. In such an embodiment, the method may then further comprise: selecting a type of content to manipulate from said post tab; defining the content to be manipulated on the social network; selecting at least one user-persona associated with the content; and posting the content to the social network for display in the display window.

4. BRIEF DESCRIPTION OF THE DRAWINGS

A graphical user interface system according to several embodiments of the present invention for displaying content on a user interface and for integrating information and social network content management will now be described with reference to the accompanying drawing figures, in which.

Similar reference numerals refer to corresponding parts throughout the several views of the drawings.

5. DETAILED DESCRIPTION OF SEVERAL EMBODIMENTS

Several embodiments of the present invention provide for graphical user interface systems 100 for displaying content on a user interface 104 and for integrating information, communication and social network content management. Further embodiments also provide for methods of manipulating and controlling information, communication and social network content using a graphical user interface (GUI) system. The systems according to certain embodiments of the present invention may be used in one or more types of computing systems such as desktop, laptop, touchscreen, mobile phone, tablet, e-reader, or other types of computer systems comprising a user interface.

Figure 1:
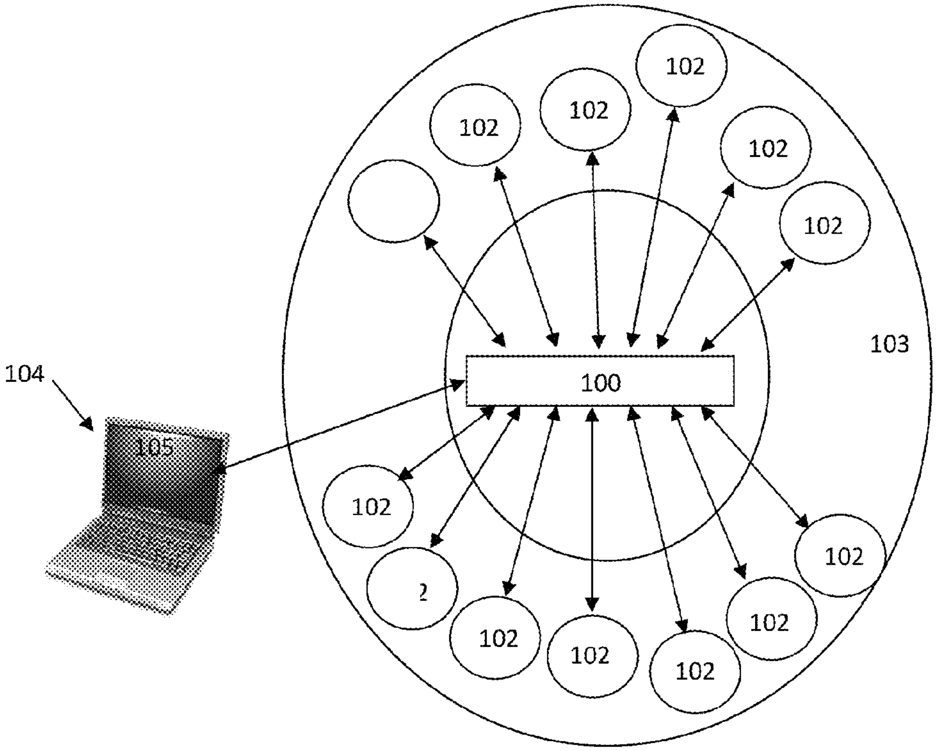
FIG. 1 illustrates a schematic diagram of a graphical user interface system for displaying content on a user interface and for integrating information and social network content management according to an embodiment of the present invention.
Figure 2:
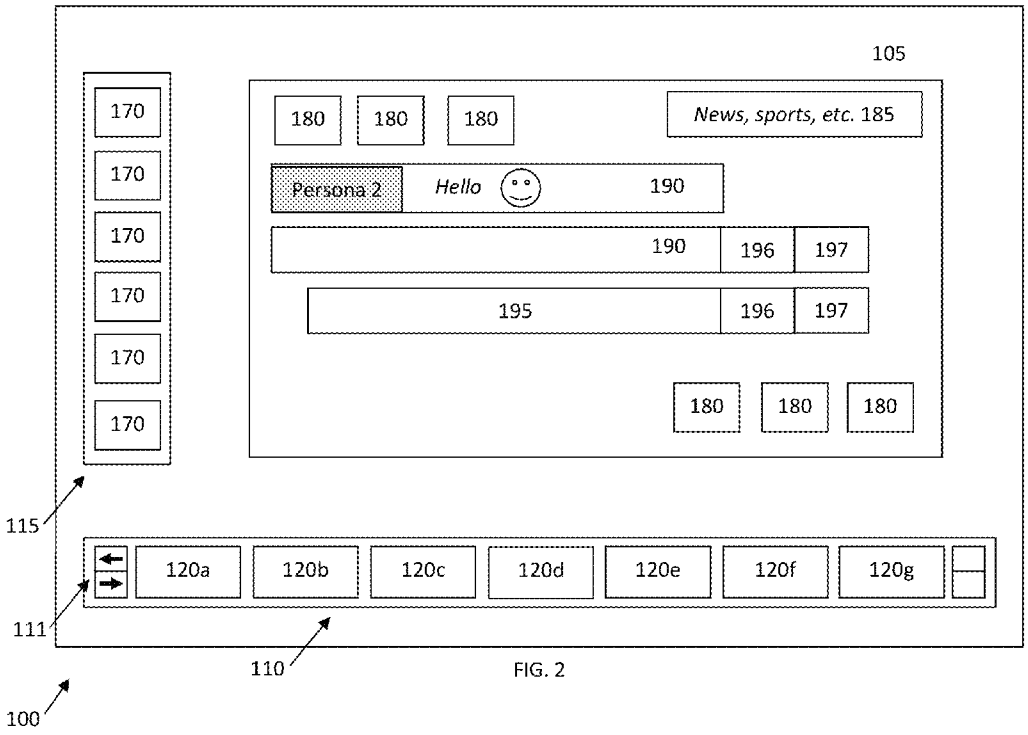
FIG. 2 illustrates a front view of a graphical user interface system for displaying content on a user interface and for integrating information and social network content management according to an embodiment of the present invention.

FIG. 1 illustrates the graphical user interface system 100 for displaying content on a user interface 104 and for integrating information and social network content management according to an embodiment of the present invention. The user interface 104 may be comprised in a user computing device such as a mobile phone, laptop computer, desktop computer, touchscreen computer or a tablet, for example. The system 100 interacts with several different virtual sources of content 102. These content sources 102 may be connected to one another through a network 103 which may include one or more of: a local area network, wide area network, world wide web (WWW), or the global Internet, for example, such that a user computing device 104 may communicate with other computers including virtual sources of content 102 similarly connected to network 103. The user interface 104 may be connected to this network 103 by any suitable means, such as wired, wireless or other network connections, for example, which allow for the transmission of data FIG. 2 illustrates a front view of the graphical user interface system 100 according to an embodiment of the present invention. The graphical user interface system comprises a display window 105, a horizontal panel 110 for manipulating content from the Internet or at least one social network, and a vertical panel 115 for displaying chronologically updated content from at least one social network or other user content account. The horizontal panel 110 comprises a plurality of menu tabs 120*a*-120*g*, and in some embodiments may further comprise submenu tabs (not shown in FIG. 2 but described below). Horizontal panel 110 also comprises a plurality of tabs 111 for expanding and/or collapsing between the menu tabs 120 and optional submenu tabs (not shown) and optional content manipulation display windows (not shown in FIG. 2 but described below).

The display window 105 may comprise, for example, a screen on a mobile phone, laptop or desktop computer, or a tablet, and may have one or more of main window button(s) such as for opening, minimizing and closing the window, drop down menu(s), and a scrolling feature such as a scrollbar for moving the content within the display window 105 of the user interface and displaying content from at least one social network and/or other user content account or internet content source. The horizontal panel 110 desirably allows a user to efficiently interact with content on a social network or other virtual user content account. The horizontal panel 110 may be moveable within the user interface to any desirable position on a screen, and may desirably overlay any underlying display window 105 (see FIG. 9). Horizontal panel 110 further comprises tabs 120 disposed on it which upon activation (such as by use of a pointer or mouse to select the tab) allow a user to manipulate or upload media or information on a social network, in an user content account (such as a content sharing or aggregation network or system), or an internet communication network (such as a forum, bulletin board, posting list or chatroom), for example. These tabs 120 are disposed on the horizontal panel 110 and selectable by a user for manipulating content from the at least one social network source and content which may be displayed in the display window 105. The tabs 120 may comprise, for example, a post tab 120*a* for selecting a type of content on the display window to be manipulated, a media tab 120*b* for manipulating audio/visual media content on the display window, a social tab 120*c* for manipulating one or more type of social media (such as messages, comments, pictures, video, status messages, for example) or communication content (such as email, text, picture or video messages, forum posts, for example) in the social network or internet communication network, a persona tab 120*d* for selecting at least one user-persona associated with the content to be manipulated, and an account tab 120*e* for managing at least one external user account or profile when interacting with the content on the display window. Additional tabs may be added for facilitating access to additional information and/or applications. For example, a news tab or an email tab may be added to the horizontal panel 110 and contain links to multiple news sources and/or email accounts, respectively.

Figure 11:
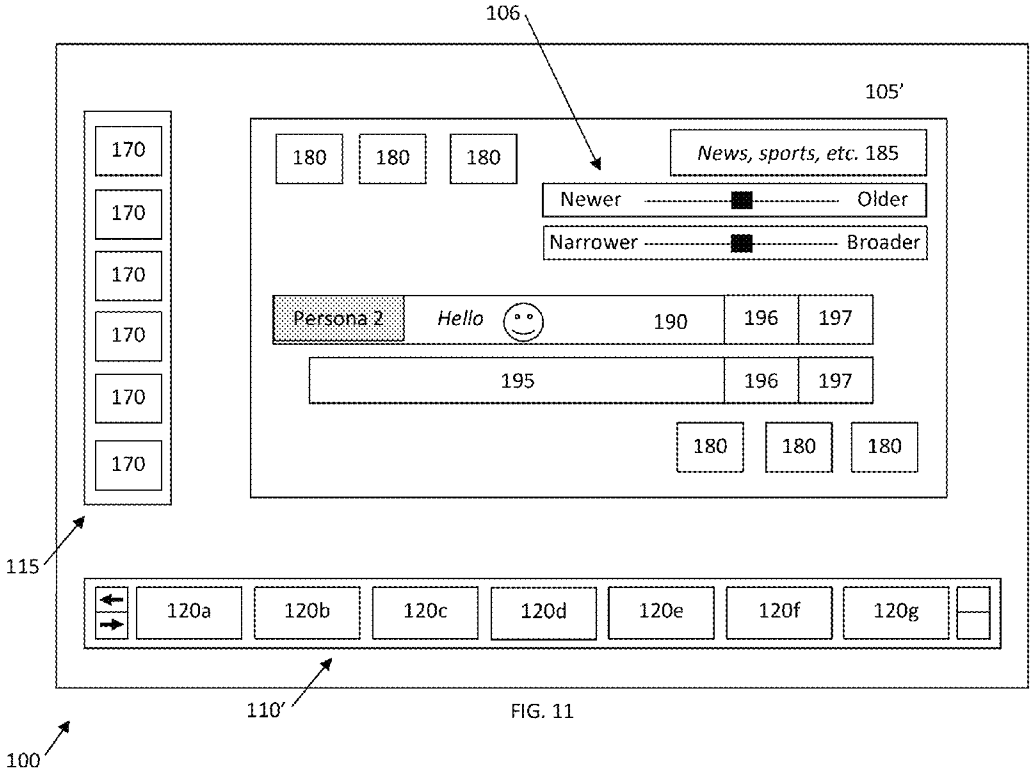
FIG. 11 illustrates an alternate embodiment of the graphical user interface system of FIG. 2 according to an embodiment of the present invention.
Figure 12:
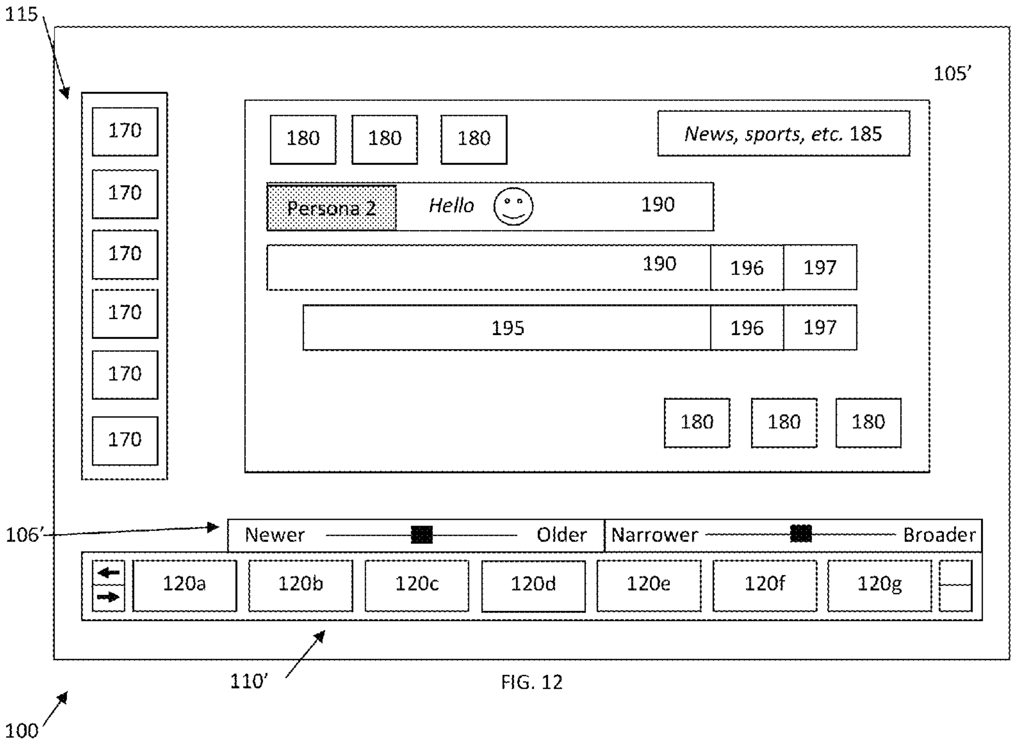
FIG. 12 illustrates a further alternate embodiment of the graphical user interface system of FIG. 2 according to an embodiment of the present invention.

A user may customize the tabs on the horizontal panel 110. The external account or profile may be a variety of accounts or profiles, including but not limited to a social network, phone, email, bank account, or system identity. The tabs 120 are disposed within the user interface and allow a user to manipulating content displayed on a window 105 from the Internet, for example from at least one social network source. In another embodiment, an additional content control feature 106, 106' may be added to the system (such as illustrated in FIGS. 11 and 12), such as one or more sliding bar(s) on the horizontal panel 110' or on the display window 105', for controlling the precision, level of detail, or nature of content 185 displayed on the display window 105'. For example, when a sliding bar additional content control feature 106, 106' is moved to a leftmost "newer" position, the content 185 displayed on the window may be limited to the newest news items, such as the top 100 news items posted on the Internet in the last 5 minutes, and vice versa when moved to a rightmost "older" position, for example.

A vertical panel 115 may also be moveable within the user interface. The vertical panel 115 displays chronologically updated content from one or more social networks and/or user content accounts. The frames 170 disposed on the vertical panel 115 may comprise, for example, a content category selection tab to select the type(s) of content to be chronologically displayed on the vertical panel, and windows for displaying an image and/or information from at least one social network or user content account or feed, such as email account(s), online banking account(s), news feed(s), chat forum(s), instant message system(s), music account(s), audio/visual media account(s), social network account(s), online dating accounts(s) or Internet-based search engine(s), for example. Each window or frame 170 may optionally have a drop-down box comprising information about the image or information from at least one user account or feed. The information and content from the at least one user account(s) or feed(s) may comprise an email account, an online banking account, a news feed, a chat forum, an instant message system, a music account, an audio/visual media account, a social network account, or an Internet-based search engine, for example.

Figure 3:
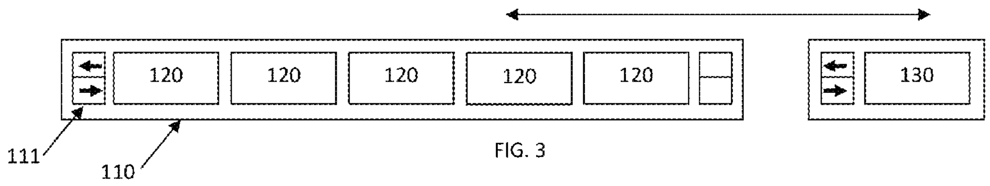
FIG. 3 illustrates a front view of a graphical user interface system and its components according to an embodiment of the present invention.
Figure 4:
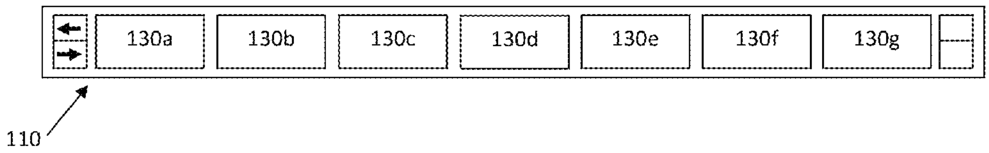
FIG. 4 illustrates a front view of the horizontal panel of FIG. 2 according to an embodiment of the present invention.
Figure 5:
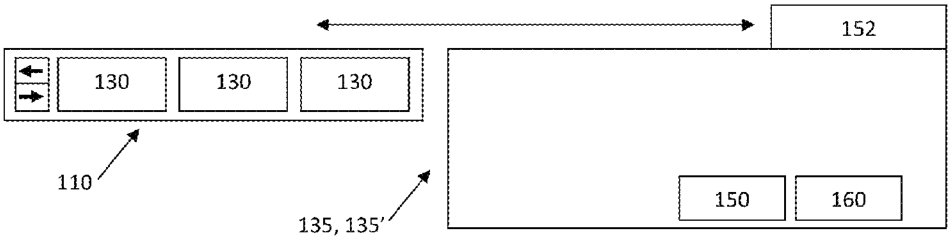
FIG. 5 illustrates a front view of the horizontal panel of FIG. 2 in transition according to a further embodiment of the present invention.

FIGS. 3-5 illustrate a front view of the horizontal panel 110 of FIG. 1 according to embodiments of the present invention. As discussed above, the horizontal panel 110 comprises tabs 120 for interacting with content from social network(s) or user content account(s) and the content displayed in display window 105. Such interactions include but are not limited to sending messages to someone or something, posting comments, status information or responses on a website, social media site or communication/user content site, and uploading and/or downloading or editing text and/or audio/visual media to or from a social network or user content account.

In one embodiment, selection of a tab 120 by a user activates a GUI transition between different menu options on the horizontal panel 110 where one or more submenu tabs or submenu items 130 slide horizontally into view on the horizontal panel 110 appearing from one end of the panel. For example, as illustrated in FIG. 4, when a user selects one of the tabs 120, the horizontal panel's tabs 120 slide horizontally out of view and are replaced by a second set of submenu tabs 130, which comprise submenu items relating to the selected tab 120. FIG. 3 illustrates the horizontal panel's menu tabs 120 and submenu tabs 130 in transition. FIG. 4 illustrates the submenu tabs 130 visible on the horizontal panel 110 after the transition, when the original menu tabs 120 are no longer visible. For example, if a user selects a post tab 120*a* for selecting a type of content on the display window that the user wishes to manipulate, the horizontal panel tabs 120 may then transition to submenu tabs by shifting horizontally. The main set of tabs 120 slide horizontally out of view and are replaced by the post submenu tabs 130 which comprise options for uploading content in the display window. The post submenu tabs 130 are submenu items/options related to the post tab 120*a* that allow a user to upload or post content on the display window. The post submenu tabs 130 may comprise, for example, a status tab 130*a*, a link tab 130*b*, a question tab 130*c*, a blog tab 130*d*, an event tab 130*e*, a poll tab 130*f*, and an activity tab 130*g*. When a user selects a submenu tab 130, a window 135 containing one or more button(s) 140, 150, 151, 152, 153, 154, 160 and text box(es) 190, 195 may appear to allow the user to enter and/or manipulate the desired content relating to the selected submenu tab 130. Similar to as discussed above, the transition between the horizontal panel 110 containing the submenu tabs 130 and the window 135 for uploading/posting content to an internet content source/feed (which may optionally be displayed in display window 105 to allow viewing by the user during posting/uploading) occurs by the window 135 sliding horizontally into view to occupy the horizontal panel's 110 previous position on the user interface, and the horizontal panel 110 sliding horizontally out of view. The arrow in FIG. 5 depicts the horizontal direction through which these features slide into and out of view on the horizontal panel 110.

Figure 6:
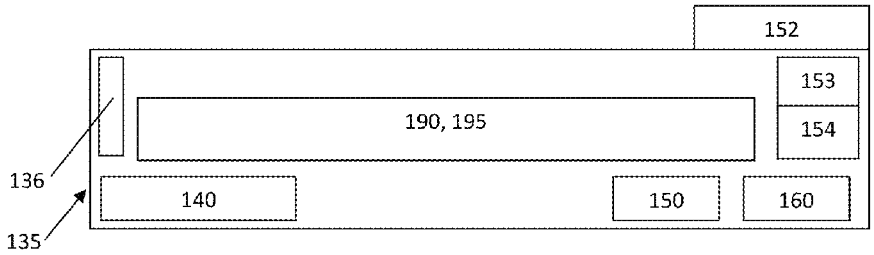
FIG. 6 illustrates a front view of the horizontal panel of FIG. 2 with a window for posting text or uploading media onto a display window, according to another embodiment of the present invention.
Figure 7:
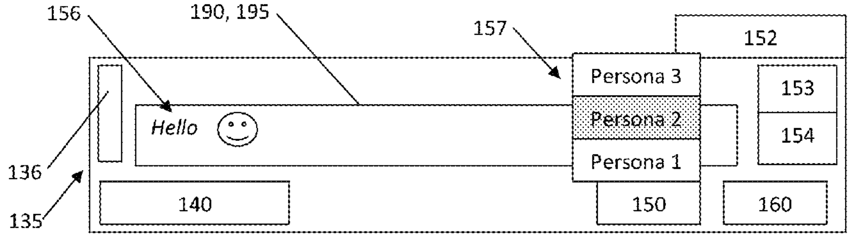
FIG. 7 illustrates a front view of the window for posting content such as text or uploading media of FIG. 6 according to another embodiment of the present invention.

FIGS. 6 and 7 illustrate a front view of the window of FIG. 4 for uploading information, such as comments or media, and a persona selection tool according to an embodiment of the present invention. A window 135 appears when a user selects a submenu tab 130 on the horizontal panel. The window 135 may comprise, for example, button(s) 136, 140, 150, 152, 153, 154, 160 and text box(es) 190, 195 for interacting with content 156 on the display window 105, such as posting comments 156 on a website, and uploading and/or downloading media 156 to/from a social network or a user content account.

According to one embodiment, to post a status update on a social network or user content account source or feed which may be shown on the display window 105, the user selects the post tab 120*a*, and then the post sub-menu status tab 130*a*. The post submenu status tab 130*a* may, upon selection by a user, provide buttons 140 and a text box 190 for attaching information to and controlling the status text entered by the user, such as shown in FIG. 6, for example. For example, the status submenu tab 130*a* may comprise a status text box 190 for entering status text, an optional geographical location button for attaching geographical location information to the status text, a privacy button for controlling the privacy and accessibility of the status text, a notification button for controlling the publication of the status text, and a select user-persona button for selecting one of the user-personas associated with the status information.

Figure 8:
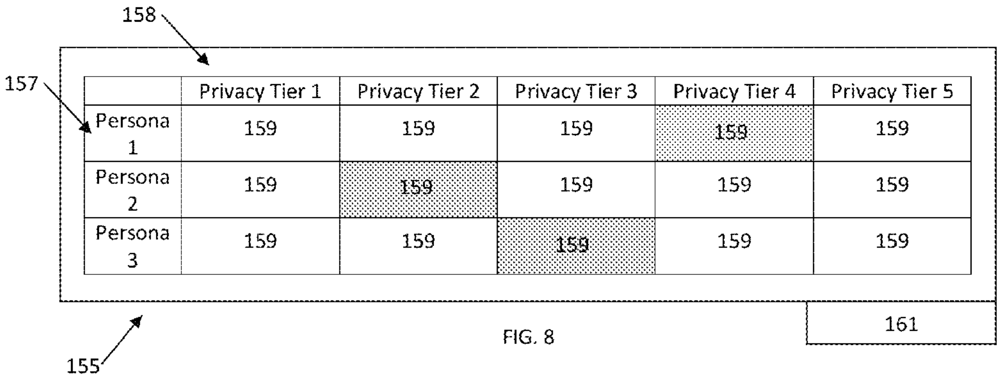
FIG. 8 illustrates a front view of a window for selecting personas and privacy levels according to an embodiment of the present invention.

As illustrated in FIGS. 7 and 8 according to one embodiment, a user may enter status information into a text box 190, and select a persona/privacy tab or button 157 from which to upload/post the content 156. This tab 157 also allows the user to select from options to control the privacy or availability or accessibility of the uploaded/posted content 156. The user may select additional tabs 140 for attaching additional information, such as text, images, geographical location information, or category tags, to the status information 156. Upon a user selecting the user-persona button 157, a privacy grid 155 appears and enables a user to select options to control the privacy of the status text by specifying which user persona is associated with the text (e.g. Persona 1, Persona 2, Persona 3, etc.) and which privacy tier (e.g. Privacy Tier 1, Privacy Tier 2, etc.) the text is published to and/or accessible by. Different privacy tiers 158 may be created and configured to correspond with different scopes of privacy and limit access to the uploaded/posted content 156 to certain other users. For example, tier 1, tier 2, tier 3, tier 4, and tier 5 privacy settings may be created and assigned to the content 156 to limit access to the content 156 to, for example, groups including only the user, a certain group of people or things, an extended network of users such as friends, a further extended network of users such as friends, family, and/or acquaintances, or anyone and everything (i.e. the public), respectively. The personas from which the content is uploaded/posted may also be manipulated in the privacy grid window 155. A user may simultaneously select persona and privacy settings for the content 156 in the privacy grid window 155. Upon configuring the persona and privacy settings for the content 156, the post button 161 uploads/posts the content 156 to the display window 105. The status tab 130*a* also may have a status post button for uploading the status information onto the display window.

According to one embodiment, after the user selects the persona/privacy tab or button 157, a privacy grid window 155 appears according to an embodiment of the present invention, as illustrated in FIG. 8. The privacy grid window 155 contains a series of buttons 159, 161 for customizing privacy setting(s) 158 for the uploaded/posted content 156 and controlling the content's privacy. The user then posts the content 156 on the display window 135 by selecting the post tab or button 160, as illustrated in FIG. 7, for example.

In a further embodiment of the present invention, to post a comment on a social network or user content account source or feed which may be shown on the display window 105, the user selects the comment button 152. Selection of this comments button 152 activates a comment window 135. The comment window has at least one text box 195 for entering comments about the content on a social network or user content account source or feed which may also be displayed in the display window, a select user-persona button 157 for selecting the at least one user-persona associated with the comments, and a plurality of buttons 136, 140, 150, 152, 153, 154, 160 for customizing or adding features to the comments, such as category tags, and for uploading and displaying the comments in the display window. The user enters the comment information, such as text, images, geographical location information, or category tags, into the comment text box 195, and selects a persona/privacy tab or button 157 for selecting a persona, such as a professional persona, a personal persona, or an anonymous persona, each of which may be associated with one or more user identity on an internet content host or social network, for example, from which to upload/post the content 156. The user then posts the content 156 on the display window 135 by selecting the post tab 160. See FIG. 7.

In an optional embodiment, the display window 105 may also comprise a micro-comment button 196 for uploading comments about the comments already displayed in the social network or other content shown in display window 105. The user may also make micro-comments, or comments related to other posted comments or uploaded media, on the display window using the micro-comment button. The micro-comment button 196 may comprise, for example, a micro-comment text box 190 for entering secondary micro-comments about the content displayed in the display window, a micro-comment select user-persona button 157 for selecting user-persona(s) associated with the micro-comments, and a micro-comment post button for uploading and displaying the micro-comments in the display window 105. In one such embodiment, to post a micro-comment, the user selects a micro-comment button 196 on the display window. A micro-comment window 135 then appears and has at least one text box 190 and a plurality of buttons 136, 140, 150, 152, 153, 154, 160. The user may then enter the micro-comment information, such as text, images, geographical location information, or category tags, into the comment text box 195, and selects a persona tab or button 157 for selecting a persona, such as a professional persona, personal, or anonymous persona, from which to upload/post the content 156. The user then posts the content 156 on the display window 135 by selecting the post tab 160. See FIG. 7, for example.

In a further embodiment, the display window 105 may also have an approval button 197 for adding an approval/disapproval indicator or vibe associated with the comments or micro-comments and displaying the approval/disapproval indicator or vibe in the display window. In one such embodiment, a vibe may be, for example, indications of an expression of approval, such as a high five or a thumbs-up sign, or vice versa, an expression of disapproval or thumbs-down. In another embodiment, a vibe may also comprise a virtual token that is redeemable for valuable points and exchangeable for real or virtual items, like a gift card, for example, by the recipient of the vibe. In one such option, vibe(s) may be exchangeable and/or assignable. A user's total number of vibes may be displayed on a display window, for example.

Figure 9:
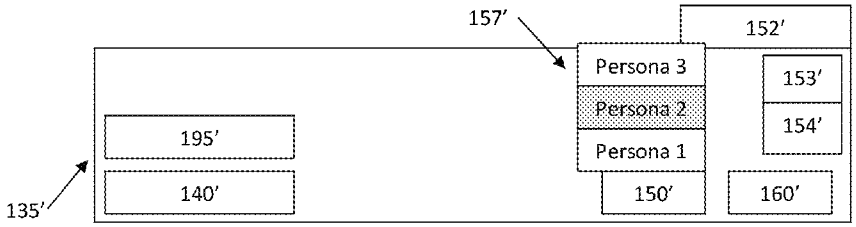
FIG. 9 illustrates a front view of the window for uploading media of FIG. 6 according to an embodiment of the present invention.

In another embodiment, a media tab 120*b* on the horizontal panel 110 is selectable by a user and may then activate the display of media interaction submenu tab(s), such as an upload tab, a images tab, a videos tab, and a files tab, for example. In one such embodiment, to upload media 156 onto a social network or user content account source or feed which may also be shown on the display window 105, the user selects the media tab 120*b*. A media window 135' may then appear such as through a horizontal sliding transition, as illustrated and described in connection with FIG. 5, and comprises, for example, a plurality of buttons 140', 150', 152', 153', 154', 157', 160', and 195' as illustrated in FIG. 9, for uploading media 156 onto a social network or user content account source or feed which may be shown on the display window 105. The user then selects the media selection tab 195' for selecting the media which the user wishes to upload. The user may select additional tabs 140' such as for activating options to attach additional information, such as text, images, geographical location information, or category tags, to the media 156. The user may also select a persona tab or button 157' for selecting a persona, such as a professional persona, a personal persona, or an anonymous persona, from which to upload/post the media 156. The user then posts the media 156 on the social network or user content account source or feed which may be shown the display window 135 by selecting the post tab 160'. See FIG. 9, for example. In such embodiments, the media may comprise audio/visual media, such as one or more of a video, an audio recording, an image, or text.

In another embodiment, the status, comment, micro-comment, and media content may include, for example, one or more of text, images, geographical location information, and/or category tags, for example.

In other embodiments, the horizontal panel 110 may also comprise other tabs for interacting with social media and other content 156 in a social network or other user account or profile. For example, the horizontal panel 110 may comprise a social tab 120*c* for manipulating one or more social media or communication content 156 in a social network or other user content account. The social tab, upon selection by a user, may have a series of social submenu tabs. These submenu tabs may comprise, for example, a contents tab, a messages tab, a chat tab, a calendar tab, a pages tab, and a networks tab. The horizontal panel 110 may also comprise a persona tab 120*d* such as for creating, managing, and selecting user-persona(s) associated with the content 156 to be manipulated. The persona tab 120*d*, upon selection by a user, may have a series of personal submenu tabs and/or buttons, such as a picture tab, a theme tab, and other button(s) for creating and manipulating the user's persona(s) or accounts, which may be associated with the content 156 on a social network or other user content account. a picture submenu tab, for example, may have, upon selection by a user, a profile picture window for uploading a profile picture into the display window 105. This profile picture window may also have a file selection tab for selecting a profile picture to upload onto the window, an assignment tab for assigning the profile picture to the at least one user-persona, and an upload/post tab for uploading the profile picture onto the display window 105.

In another embodiment, the horizontal panel 110 may also have a geographical location tab for providing geographical location information such as the user's current, previous or future geographical location in relation to when the user uses the system 100 or a previous or anticipated future time. The panel 110 may also optionally have a content management tab 120*e* for interacting with content displayed on a social network or user content account source or feed which may be shown in the display window. The content management tab 120*e* may also comprise content management submenu buttons, such as an edit button, a remove button, a share button, and a comment button for uploading comments about the content displayed in the display window. The panel 110 may also optionally have an account tab 120*g* for managing external user account(s) or profile(s) when interacting with the content 156 on the display window, as discussed above.

Figure 10:
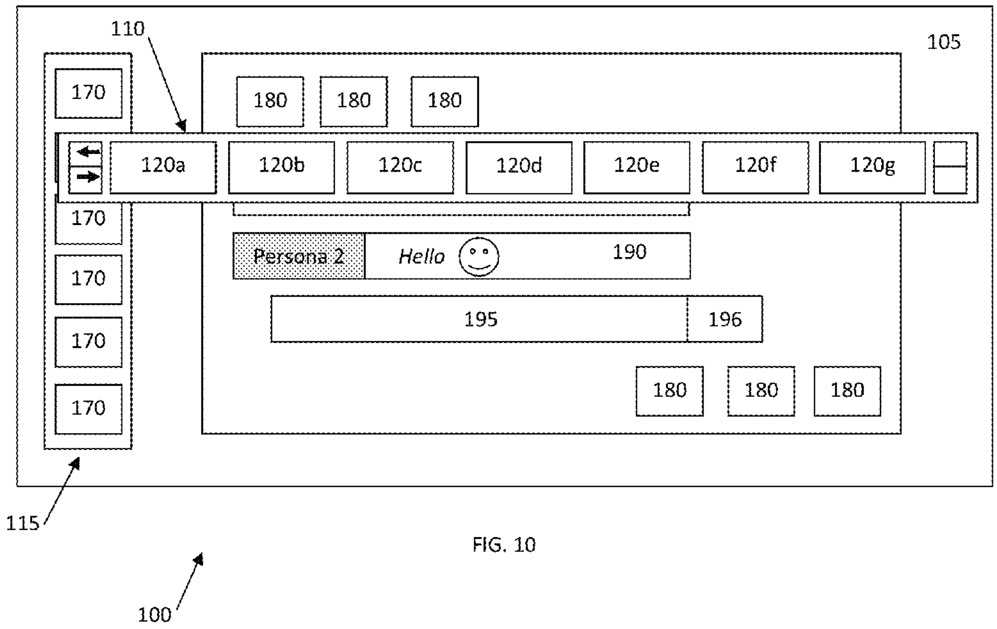
FIG. 10 illustrates a front view of the graphical user interface system of FIG. 2 with the horizontal panel moved to a different position on the interface according to an embodiment of the present invention.

In a further embodiment, the horizontal panel 110 may be moveable within the user interface separately from the display window 105. It can be moved freely around the interface, such as illustrated in FIG. 10, which shows the horizontal panel 115 in a different position on the interface according to an embodiment of the present invention. The horizontal panel may be opaque or translucent, and may typically be disposed in front of the rest of the contents on the user interface such as for visibility and accessibility. In some embodiments, the horizontal panel 110 may also fade into and out of view on the interface such as depending on which other windows the user may select or have active on the GUI.

In a further embodiment of the present invention, the system 100 may also have a vertical panel 115 for displaying chronologically updated content from at least one social network or other user content account, which may include exemplary sources such as social network account(s), newsfeeds, blog feeds, user forums, chatrooms, user content sharing feeds, messaging streams or feeds, for example. The vertical panel 115 may also optionally be moveable within the user interface separately from the display window 135 and may in some embodiments further comprise frames 170, which may comprise content category selection tab(s) 170 and windows for displaying an image from one or more user content accounts, social networks or feed(s). In some embodiments, each frame or window 170 may comprise a drop-down selection box that comprises information about the image from the account(s) or feed(s). The information and content from the account(s) or feed(s) may be from a variety of sources, including but not limited to an email account, an online banking account, a news feed, a chat forum, an instant message system, a music account, an audio/visual media account, a social network account, an Internet-based search engine, or the like.

One embodiment of the present invention relates to a computer storage product with a computer-readable medium having computer code thereon for performing various computer-implemented operations according to user interface and interaction methods according to embodiments of the invention. The computer-readable media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices including Flash RAM memory storage cards, sticks and chips, for example. Examples of computer code include machine code, such as produced by a compiler, and files containing higher-level code that are executed by a computer using an interpreter. For example, an embodiment of the invention may be implemented using HTML, XML, JavaScript, Java, C#, C++, Objective C, or other scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A non-transitory computer-readable medium storing computer-executable instructions for displaying content within a user interface on a computer display device and for integrating and manipulating social network content by way of a graphical user interface system, the graphical user interface system comprising:

- a display window disposed within the user interface for displaying and manipulating content from at least one social network;
- a horizontal panel for manipulating content from at least one social network;
- a plurality of tabs disposed on the horizontal panel and selectable by a user for manipulating the content from the at least one social network and the display window, the plurality of tabs comprising:
  - a post tab for selecting a type of content to be manipulated;
  - a media tab for manipulating audio/visual media content;
  - a social tab for manipulating one or more social media or communication content in the social network;
  - a persona tab for configuring at least one user-persona associated with the content to be manipulated;
  - an account tab for managing at least one external user account or profile when interacting with the content; and
  - a content management tab for interacting with content displayed in the display window, the content management tab comprising a comment button for uploading comments about the content displayed in the display window, the comment button comprising:
    - a comment text box for entering comments about the content displayed in the display window;
    - a select user-persona button for selecting the at least one user-persona associated with the comments; and
    - a post button for uploading and displaying the comments in the display window.

2. The non-transitory computer-readable medium of claim 1 further comprising a vertical panel for displaying chronologically updated content from at least one social network feed, the vertical panel comprising:

- a content category selection tab for selecting a type of content to be displayed in the vertical panel; and
- windows for displaying an image from at least one user-persona or feed, each of the windows comprising a drop down box comprising information about the image from at least one user-persona or feed;
- wherein the information and content from the at least one social network feed comprises at least one of: an email account, an online banking account, a news feed, a chat forum, an instant message system, a music account, an audio/visual media account, a social network account, or an Internet-based search engine.

3. The non-transitory computer-readable medium of claim 1 wherein the at least one external account or profile comprises a social network, phone, email, bank account, and system identity account or profile.

4. The non-transitory computer-readable medium of claim 1 further comprising a geographical location tab for providing geographical information associated with the content.

5. The non-transitory computer-readable medium of claim 1 further comprising a content management tab for interacting with content displayed in the display window.

6. The non-transitory computer-readable medium of claim 1, wherein the content management tab comprises a plurality of content management buttons.

7. The non-transitory computer-readable medium of claim 6, wherein the content management buttons comprise: an edit button; a remove button; a share button; and said comment button for uploading comments about the content displayed in the display window.

8. The non-transitory computer-readable medium of claim 1, the display window further comprising a micro-comment button for uploading comments about the comments displayed in the display window, the micro-comment button comprising:

a micro-comment text box for entering secondary micro-comments about the content displayed in the display window;

a micro-comment select user-persona button for selecting the at least one user-persona associated with the micro-comments; and a micro-comment post button for uploading and displaying the micro-comments in the display window.

9. The non-transitory computer-readable medium of claim 8, the display window further comprising an approval button for adding an approval indication associated with the comments or micro-comments and displaying the approval indication in the display window.

10. The non-transitory computer-readable medium of claim 1, wherein the horizontal panel is moveable within the user interface separately from the display window.

11. The non-transitory computer-readable medium of claim 2, wherein the vertical panel is moveable within the user interface separately from the display window.

12. The non-transitory computer-readable medium of claim 1, the post tab further comprising upon selection by a user a plurality of post sub-tabs for uploading content in the display window.

13. The non-transitory computer-readable medium of claim 12, the plurality of post sub-tabs comprising one or more of: a status tab; a link tab; a question tab; a blog tab; an event tab; a poll tab; and an activity tab.

14. The non-transitory computer-readable medium of claim 1, the persona tab further comprising upon activation by a user, a privacy grid for selecting one or more privacy setting controlling privacy of the content.

15. The non-transitory computer-readable medium m of claim 14, wherein the privacy grid comprises privacy buttons associated with combinations of the user-personas and privacy tiers for controlling the privacy of the content.

16. The non-transitory computer-readable medium of claim 1, the media tab comprising upon selection by a user a plurality of media interaction tabs.

17. The non-transitory computer-readable medium of claim 1, the media tab comprising, upon selection by a user, one or more of: an upload tab; an images tab; a videos tab; and a files tab.

18. The non-transitory computer-readable medium of claim 1, wherein the audio/visual media content comprises one or more of: a video; an audio recording; an image; or text.

19. The non-transitory computer-readable medium of claim 1, the social tab comprising, upon selection by a user, one or more of: a contents tab; a messages tab; a chat tab; a calendar tab; a pages tab; and a networks tab.

20. The non-transitory computer-readable medium of claim 1, wherein the persona tab comprises, upon selection by a user, a plurality of persona submenu tabs for creating and manipulating the at least one user-persona associated with the content.

21. The non-transitory computer-readable medium of claim 1, wherein selection of a tab by a user activates a transition to reveal submenu options on the horizontal panel wherein the submenu options slide horizontally into view on the horizontal panel appearing from one end of the panel.

22. A non-transitory computer-readable medium storing computer-executable instructions to implement a method of integrating and manipulating social network content on a graphical user interface system, comprising computer-executable instructions to:

provide a graphical user interface system, the system comprising:

a display window disposed within the user interface displaying and content from at least one social network, a horizontal panel for manipulating content from at least one social network;

a plurality of tabs disposed on the horizontal panel and selectable by a user for manipulating the content from the at least one social network and the display window, the plurality of tabs comprising:

a post tab for selecting a type of content to be manipulated;

a media tab for manipulating audio/visual media content;

a social tab for manipulating one or more social media or communication content in the social network;

a persona tab for configuring at least one user-persona associated with the content to be manipulated;

an account tab for managing at least one external user account or profile when interacting with the content;

select a type of content to manipulate from said post tab;

define the content to be manipulated on the social network;

select at least one user-persona associated with the content;

post the content to the social network for display in the display window;

and a content management tab for interacting with content displayed in the display window, the content management tab comprising a comment button for uploading comments about the content displayed in the display window, the comment button comprising:

a comment text box for entering comments about the content displayed in the display window; a select user-persona button for selecting the at least one user-persona associated with the comments;

and a post button for uploading and displaying the comments in the display window.

* * * * *